United States Patent
Conanan

(10) Patent No.: US 12,405,398 B2
(45) Date of Patent: Sep. 2, 2025

(54) SHIELDING PORT FOR NUCLEAR LOGGING TOOL WITH GAMMA RAY SOURCE

(71) Applicant: Schlumberger Technology Corporation, Sugar Land, TX (US)

(72) Inventor: Gerardo Conanan, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 169 days.

(21) Appl. No.: 18/483,008

(22) Filed: Oct. 9, 2023

(65) Prior Publication Data
US 2025/0116795 A1 Apr. 10, 2025

(51) Int. Cl.
*G01V 5/12* (2006.01)
*E21B 47/017* (2012.01)

(52) U.S. Cl.
CPC .............. *G01V 5/12* (2013.01); *E21B 47/017* (2020.05)

(58) Field of Classification Search
CPC ................................ E21B 47/017; G01V 5/12
See application file for complete search history.

(56) References Cited

U.S. PATENT DOCUMENTS

| | | | | |
|---|---|---|---|---|
| 4,034,218 | A * | 7/1977 | Turcotte | G01V 5/125 250/269.3 |
| 10,208,587 | B1 * | 2/2019 | Kasten | G01V 5/12 |
| 2005/0028586 | A1 * | 2/2005 | Smits | G01V 5/12 250/269.4 |
| 2013/0134304 | A1 * | 5/2013 | Beekman | G01V 5/101 250/269.6 |
| 2013/0277114 | A1 * | 10/2013 | Hook | E21B 47/017 175/50 |
| 2014/0097336 | A1 * | 4/2014 | Evans | G01V 5/14 250/267 |
| 2014/0251690 | A1 | 9/2014 | Simon | |
| 2015/0124921 | A1 * | 5/2015 | Groves | G21G 4/04 376/160 |
| 2015/0185358 | A1 * | 7/2015 | Stoller | G01V 5/101 250/269.6 |
| 2016/0306070 | A1 * | 10/2016 | Simon | G01V 5/12 |

OTHER PUBLICATIONS

"EcoScope Users Guide", 2010 Schlumberger, Retrieved from <<https://www.slb.com/resource-library/book/ecoscope-users-guide>>, pp. 99-117.
"EcoScope Users Guide", Retrieved from <<https://www.slb.com/resource-library/book/ecoscope-users-guide>>, Mar. 11, 2011, 3 Pages.

* cited by examiner

*Primary Examiner* — Blake C Riddick
(74) *Attorney, Agent, or Firm* — Jeffrey D. Frantz

(57) ABSTRACT

A system includes a shield of a nuclear logging tool. The shield includes a shielding insert configured to mount at least partially inside the nuclear logging tool between a gamma ray source of the nuclear logging tool and a gamma ray detector of the nuclear logging tool. A first portion of the shielding insert is configured to mount in a collar of the nuclear logging tool and a second portion of the shielding insert is configured to mount in a chassis of the nuclear logging tool. The shield also includes a chassis shielding block configured to mount in the chassis between the gamma ray source and the gamma ray detector and a shielding top plate configured to couple to the collar and at least partially retain the shielding insert in the collar.

20 Claims, 9 Drawing Sheets

SHIELDING PORT FOR NUCLEAR LOGGING TOOL WITH GAMMA RAY SOURCE

BACKGROUND

The present disclosure relates generally to well logging techniques and, more particularly, to gamma ray density measurement for subterranean formations using a nuclear logging tool with a gamma ray source.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Formation density is a crucial property of rocks for evaluating the hydrocarbon deposits. This property is usually determined by logging while drilling (LWD) during the drilling of a borehole through the formation in question, or wireline tools after the borehole has been drilled. The nuclear logging tool that is used for these measurements usually contains a radioisotopic source (e.g., $^{137}$Cs or $^{241}$AmBe) of high energy photons (e.g., gamma rays) and radiation detectors (e.g., gamma ray detectors). The formation density measurement involves the scattering of gamma rays through the formation. A formation density may be obtained by irradiating the formation with gamma rays using the radioisotopic source (e.g., $^{137}$Cs or $^{241}$AmBe). These gamma rays may Compton scatter from the electrons present in the formation before being detected by a gamma ray detector spaced some distance from the gamma ray source. Since the electron concentration is proportional to the atomic number of the elements, and the degree to which the gamma rays Compton scatter and return to the gamma ray detector relates to the electron concentration, the density of the formation may be measured using this technique.

However, the gamma ray detector in the nuclear logging tool may detect gamma rays that transmit in the nuclear logging tool itself. For example, some gamma rays emitted from the gamma ray source may transmit inside the nuclear logging tool, such as a chassis of the logging tool, a collar of the logging tool, or other tool structures. The gamma rays detected outside of the formation may not provide substantial information regarding the properties of the formation and may represent noise that would be desired to reduce or subtracted from the overall signal received by the gamma ray detector. Accordingly, a need exists for shielding in the nuclear logging tool, wherein the shielding blocks undesirable gamma ray transmissions inside the nuclear logging tool.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Certain embodiments of the present disclosure include a system that includes a shield of a nuclear logging tool. The shield includes a shielding insert configured to mount at least partially inside the nuclear logging tool between a gamma ray source of the nuclear logging tool and a gamma ray detector of the nuclear logging tool. A first portion of the shielding insert is configured to mount in a collar of the nuclear logging tool and a second portion of the shielding insert is configured to mount in a chassis of the nuclear logging tool. The shield also includes a chassis shielding block configured to mount in the chassis between the gamma ray source and the gamma ray detector and a shielding top plate configured to couple to the collar and at least partially retain the shielding insert in the collar.

Certain embodiments of the present disclosure include a nuclear logging tool. The nuclear logging tool includes a chassis, a collar disposed about the chassis, a gamma ray source configured to emit gamma rays through a first window in the collar, and a gamma ray detector configured to receive gamma rays through a second window in the collar, and the gamma ray source and the gamma ray detector are offset from one another along an axis of the chassis. The nuclear logging tool also includes a shield. The shield includes a shielding insert mounted at least partially inside the nuclear logging tool between the gamma ray source and the gamma ray detector. A first portion of the shielding insert is mounted in the collar and a second portion of the shielding insert is mounted in the chassis. The shield also includes a chassis shielding block mounted in the chassis between the gamma ray source and the gamma ray detector. The shield also includes a shielding top plate coupled to the collar and at least partially retaining the shielding insert in the collar.

Certain embodiments of the present disclosure also include a method that includes emitting gamma rays from a gamma ray source through a first window in a collar of a nuclear logging tool; receiving gamma rays at a gamma ray detector through a second window in the collar, and the gamma ray source and the gamma ray detector are offset from one another along an axis of a chassis of the nuclear logging tool; and shielding gamma rays directly between the gamma ray source and the gamma ray detector internally within the nuclear logging tool via a shield. The shield includes a shielding insert mounted at least partially inside the nuclear logging tool between the gamma ray source and the gamma ray detector. A first portion of the shielding insert is mounted in the collar and a second portion of the shielding insert is mounted in the chassis. The shield also includes a chassis shielding block mounted in the chassis between the gamma ray source and the gamma ray detector. The shield also includes a shielding top plate coupled to the collar and at least partially retaining the shielding insert in the collar.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
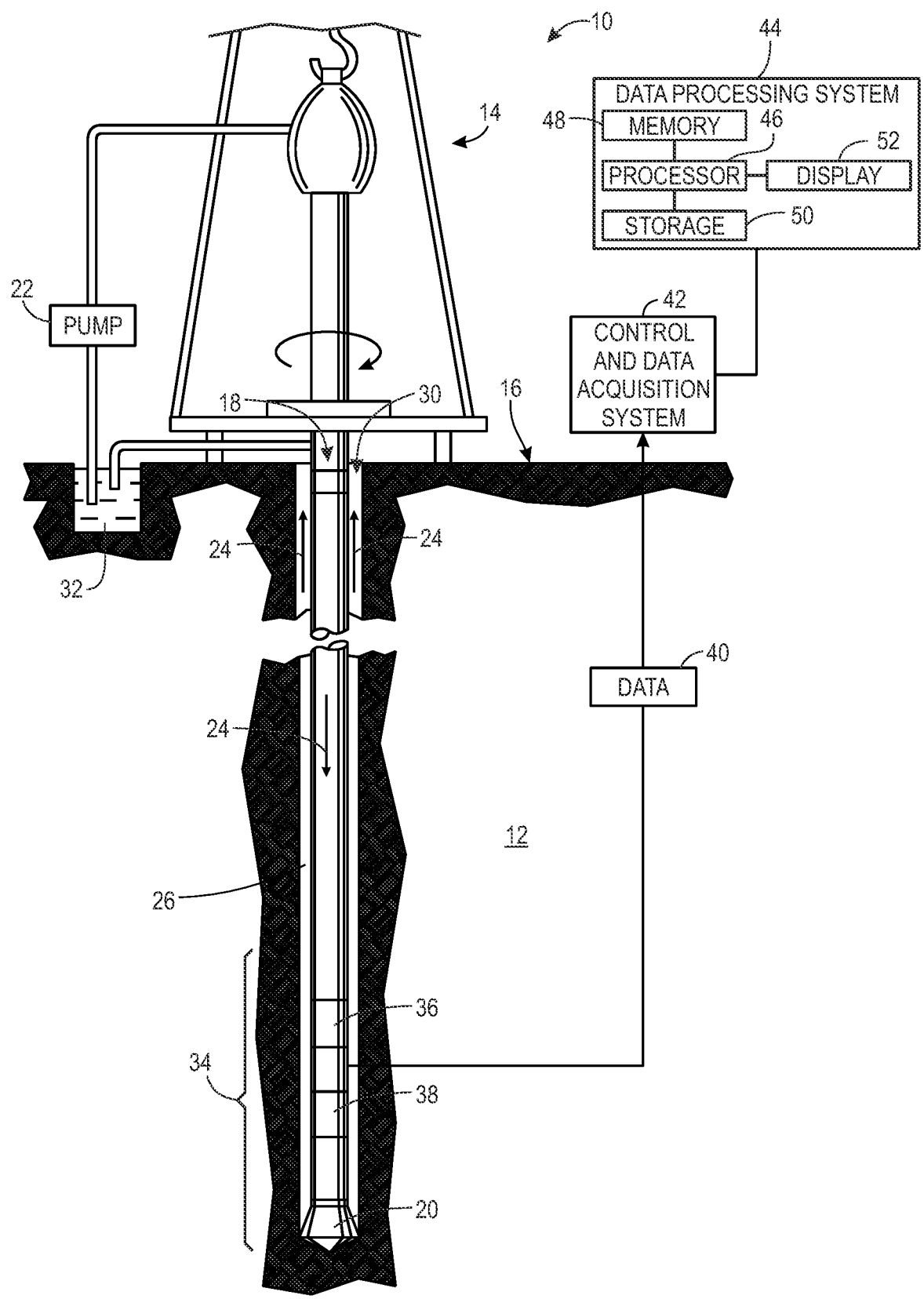
FIG. 1 is a block diagram of a drilling system for performing a gamma density measurement, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

Present embodiments relate to systems and techniques for using a nuclear logging tool with a gamma source and gamma detectors to get accurate formation density. For instance, a nuclear logging tool for obtaining such a measurement may include a gamma ray source, one or more gamma ray detectors, and data processing circuitry. When the nuclear logging tool is lowered into a borehole of a subterranean formation, the gamma ray source may irradiate gamma rays into the formation. The gamma rays interact with borehole and formation atoms and are attenuated by the formation before reaching the gamma detector(s). The data processing circuitry may determine the density of the formation based at least in part on the counts of gamma rays detected. To reduce or avoid the gamma rays transmit from the gamma ray source to the gamma ray detector(s) inside or through the nuclear logging tool, a shielding port may be used in the nuclear logging tool to sufficiently shield or block the gamma rays transmitting from the gamma ray source to the gamma ray detector(s) inside or through the nuclear logging tool, as described in greater detail herein.

With the foregoing in mind, FIG. 1 illustrates a drilling system 10 having a nuclear logging tool, as described in greater detail herein. The drilling system 10 may be used to drill a well into a geological formation 12 and obtain gamma ray spectroscopy measurements useful to identify characteristics of the well. In the drilling system 10 illustrated in FIG. 1, a drilling rig 14 at the surface 16 may rotate a drill string 18 having a drill bit 20 at its lower end. As the drill bit 20 is rotated, a drilling fluid pump 22 is used to pump drilling fluid 24, commonly referred to as "mud" or "drilling mud", downward through the center of the drill string 18 in the direction of the arrow to the drill bit 20. The drilling fluid 24, which is used to cool and lubricate the drill bit 20, exits the drill string 18 through the drill bit 20. The drilling fluid 24 then carries drill cuttings away from the bottom of a borehole 26 as it flows back to the surface 16, as illustrated by the arrows through an annulus 30 between the drill string 18 and the formation 12. However, as described above, as the drilling fluid 24 flows through the annulus 30 between the drill string 18 and the formation 12, the drilling fluid 24 may begin to invade and mix with the fluids stored in the formation 12, which may be referred to as formation fluid (e.g., natural gas or oil). At the surface 16, the return drilling fluid 24 may be filtered and conveyed back to a mud pit 32 for reuse.

As illustrated in FIG. 1, the lower end of the drill string 18 includes a bottom-hole assembly (BHA) 34 that may include the drill bit 20 along with various downhole tools. The downhole tools may collect a variety of information relating to the geological formation 12 and/or the state of drilling of the well. For example, a measurement-while-drilling (MWD) module 36 may measure certain drilling parameters, such as the temperature, pressure, orientation of the drilling tool, and so forth. Likewise, a logging-while-drilling (LWD) module 38 may measure the physical properties of the geological formation 12, such as density, porosity, resistivity, lithology, and so forth.

The LWD module 38 may collect a variety of data 40 that may be stored and processed within the LWD module 38 or, as illustrated in FIG. 1, may be sent to the surface for processing. In the example of this disclosure, the LWD module 38 may include a nuclear logging tool that may detect gamma ray spectroscopy (e.g., the energies of formation gamma rays) that result when gamma rays are emitted into the well. The range of energies of the detected gamma rays may be visualized as a spectrum of the gamma rays that are detected. The data 40 that is collected may include counts and/or detected energies of gamma rays and gamma rays that reach corresponding detectors in the LWD module 38. It should be appreciated that while the embodiment illustrated in FIG. 1 is directed to collecting data via an LWD module 38, in other embodiments, wireline tools may be used as the conveyance mode. In other words, the gamma ray nuclear logging tool may be deployed into the borehole 26 via LWD, wireline, coiled tubing, or any other suitable mode of downhole conveyance.

The data 40 may be sent via a control and data acquisition system 42 to a data processing system 44. The control and data acquisition system 42 may receive the data 40 in any suitable way. In certain embodiments, the control and data acquisition system 42 may transfer the data 40 via electrical signals pulsed through the geological formation 12 or via mud pulse telemetry using the drilling fluid 24. In other embodiments, the data 40 may be retrieved directly from the LWD module 38 when the LWD module 38 returns to the surface. As described in greater detail herein, the control and data acquisition system 42 may be configured to estimate formation properties (e.g., porosity) using nuclear data 40 provided by the LWD module 38. In addition, in certain embodiments, the control and data acquisition system 42 may be configured to control any and all operational parameters of the BHA 34 including, but not limited to, operations of a nuclear logging tool of the LWD module 38, as described in greater detail herein.

In certain embodiments, the data processing system 44 may include a processor 46, memory 48, storage 50, and/or a display 52. The data processing system 44 may use the data 40 to determine various properties of the formation 12 using any suitable techniques. As will be described in greater detail herein, the LWD module 38 may use certain selected materials to reduce signal contamination by stray gamma rays. Thus, when the data processing system 44 processes the data 40, the determined formation properties may be more accurate and/or precise than otherwise. To process the data 40, the processor 46 may execute instructions stored in the memory 48 and/or storage 50. As such, the memory 48 and/or the storage 50 of the data processing system 44 may be any suitable article of manufacture that can store the instructions. The memory 48 and/or the storage 50 may be ROM memory, random-access memory (RAM), flash memory, an optical storage medium, or a hard disk drive, to name a few examples. The display 52 may be any suitable electronic display that can display logs and/or other information relating to properties of the formation 12 as measured by the LWD module 38. It should be appreciated that, although the data processing system 44 is illustrated as being located at the surface, the data processing system 44 may be located in the LWD module 38. In such embodiments, some of the data 40 may be processed in the LWD module 38 and the data 40 may be stored in the LWD module 38, while some of the data 40 may be sent to the surface in real time. This may be the case particularly in LWD, where a limited amount of the data 40 may be transmitted to the surface during drilling or reaming operations.

Figure 2:
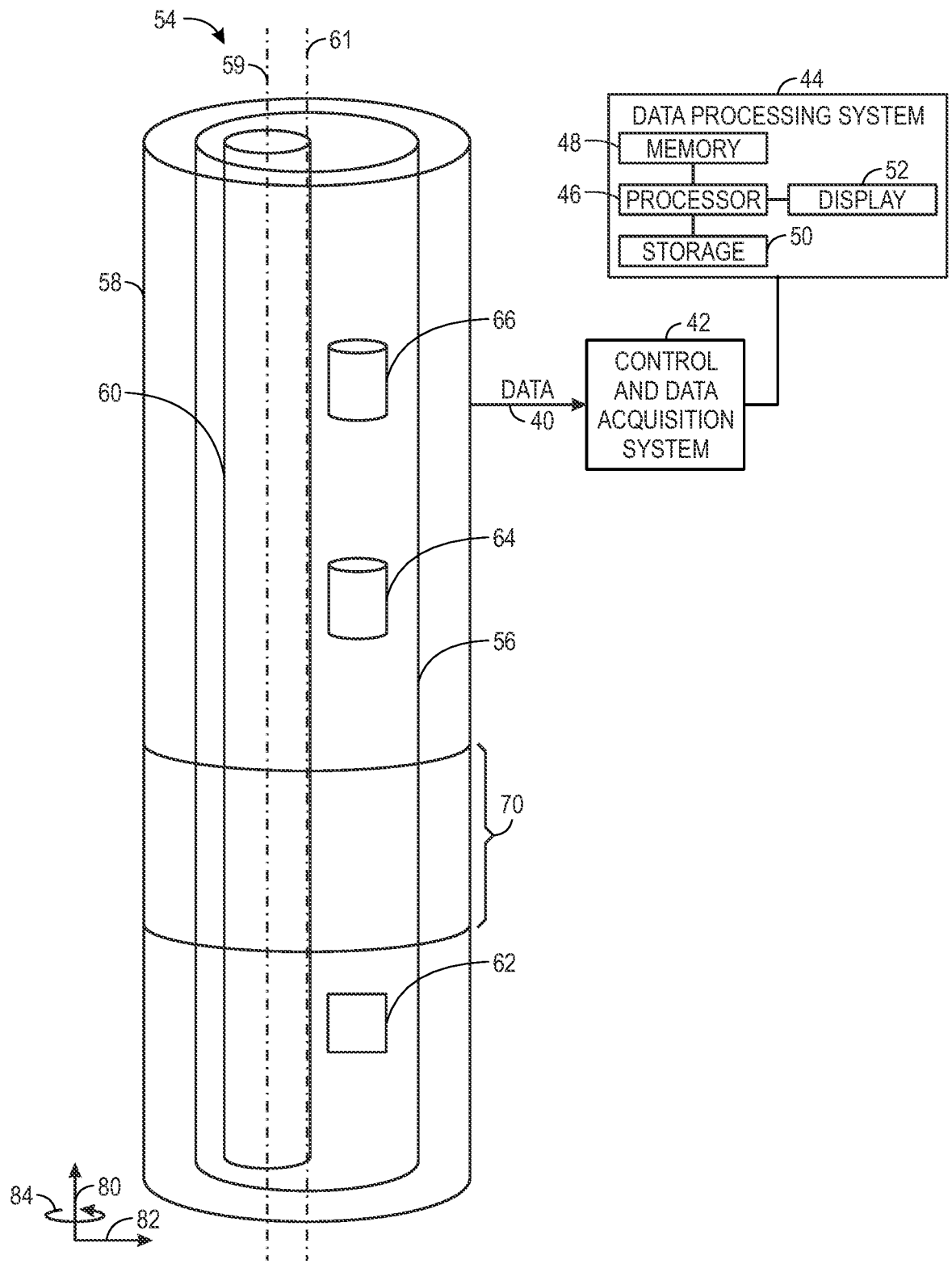
FIG. 2 is a schematic block diagram showing a perspective view of a nuclear logging tool used in the drilling system of FIG. 1, in accordance with an embodiment.

As described in greater detail herein, the LWD module 38 may include a nuclear logging tool. FIG. 2 illustrates a schematic block diagram showing a perspective view of an embodiment of the LWD module 38 being or including a nuclear logging tool 54. In certain embodiments, the nuclear logging tool 54 may include a chassis 56 (e.g., annular chassis), a collar 58 (e.g., annular collar), and a flow path 60 (e.g., annular flow path) that extends through the nuclear logging tool 54. To facilitate discussion, the nuclear logging tool 54 and its components may be described with reference to an axial axis or direction 80 (e.g., a co-axis of the collar 58 and the chassis 56), a radial axis or direction 82, and a circumferential axis or direction 84. In certain embodiments, a gamma ray source 62 may be located at a first location within the nuclear logging tool 54, a first gamma ray detector 64 may be located at a second location axially spaced from the gamma ray source 62 along the axis 80, a second gamma ray detector 66 may be located at a third location axially spaced from the gamma ray source 62 along the axis 80, with the third location farther away from the gamma ray source 62 along the axis 80 than the second location. A shield 70 that includes dense shielding material (e.g., tungsten copper, HeavyMet made of tungsten nickel iron) may be disposed about the nuclear logging tool 54 at or near the second location to reduce the undesirable gamma rays traveling from the gamma ray source 62 directly to the gamma ray detectors 64 through the LWD tool. It should be noted that the shield 70 may also be disposed at or near the third location to reduce the undesirable gamma rays traveling from the gamma ray source 62 directly to the gamma ray detectors 66 through the LWD tool. The flow path 60 may be along the axis 80, and a center symmetric axis 59 of the flow path 60 may be offset from a center symmetric axis 61 of the collar 58 along the radial axis 82. Specifics regarding this embodiment and other embodiments of spectroscopic logging tools employing the general configuration or aspects of the LWD module 38 and the nuclear logging tool 54 are envisaged for use with any suitable means of conveyance, such as wireline, coiled tubing, logging while drilling (LWD), and so forth. Further, information regarding the environment, such as the sigma of the formation 12, sigma of the drilling fluid 24, density, borehole size, and slowdown length, may be acquired using additional equipment.

In general, gamma rays emitted by the gamma ray source 62 may interact with the surrounding formation 12. The formation gamma rays may be detected by the gamma ray detectors (e.g., the first gamma ray detector 64, the second gamma ray detector 66). In certain embodiments, the gamma ray detectors may include scintillation detectors having a scintillation crystal and a photomultiplier. In certain embodiments, the gamma ray detectors (e.g., the first gamma ray detector 64, the second gamma ray detector 66) may detect the spectra—that is, the range of energies—of the formation gamma rays. The nuclear spectroscopy provided by the nuclear logging tool 54 illustrated in FIG. 2 may provide a wealth of information on the elemental composition of materials around the nuclear logging tool 54. As described in greater detail herein, the control and data acquisition system 42 may analyze the energy spectra to obtain complementary information from different sets of elements (e.g., elemental components of the surrounding formation 12). The elemental yields from these spectra respond to the geochemistry of the formation rock as well as solid organic matter, pore fluids, and the borehole 26.

Figure 3:
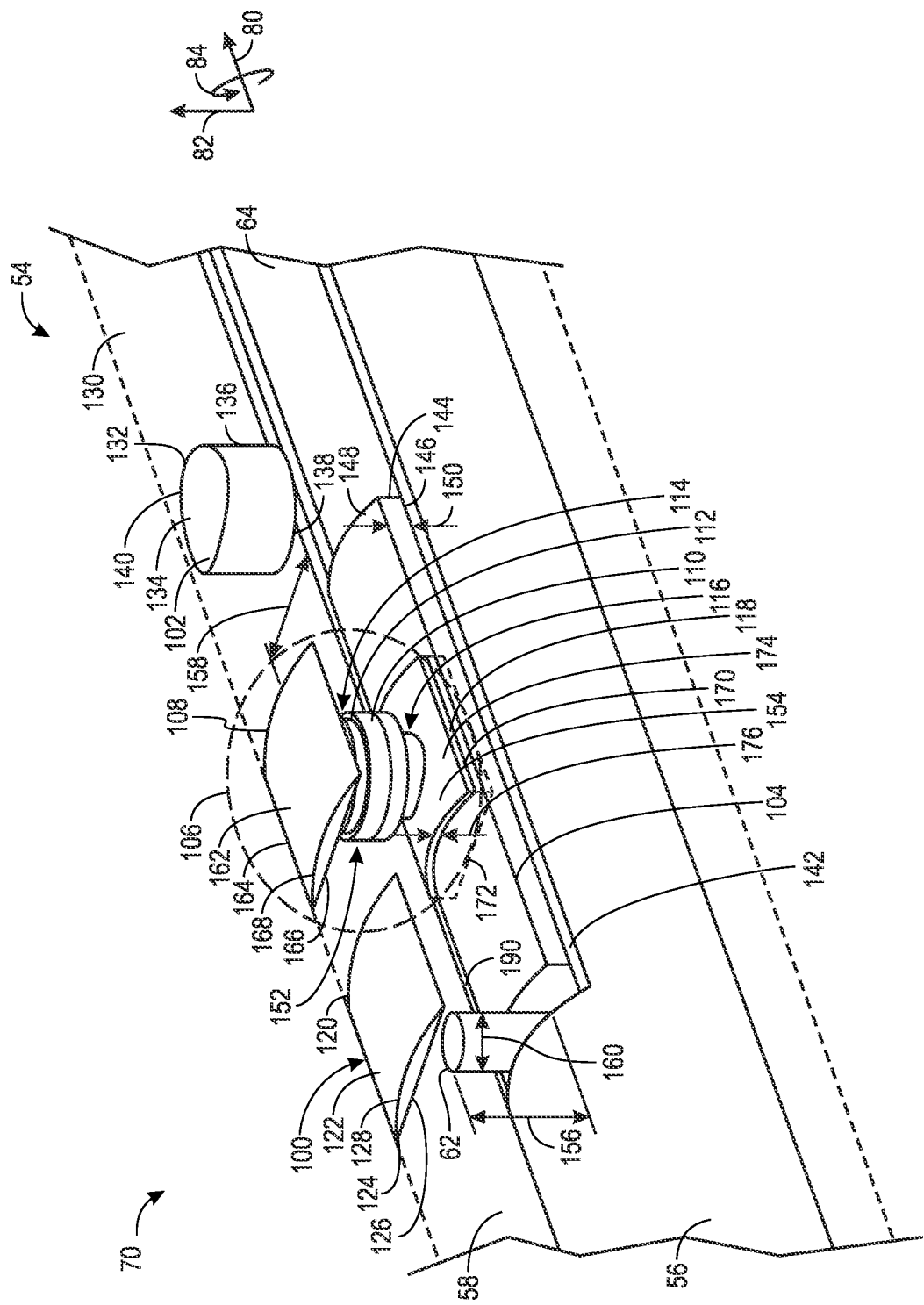
FIG. 3 is a partial perspective view of an illustrative embodiment of the nuclear logging tool used in the drilling system of FIG. 1, in accordance with an embodiment.

As described in greater detail herein, the shield 70 may include dense shielding material (e.g., tungsten copper, HeavyMet made of tungsten nickel iron) to reduce undesirable gamma rays traveling from the gamma ray source 62 directly to the gamma ray detectors inside the nuclear logging tool 54. FIG. 3 illustrates a partial perspective view of an illustrative embodiment of the nuclear logging tool 54 of FIGS. 1 and 2, further illustrating the shield 70. In the illustrated embodiment, the nuclear logging tool 54 includes a gamma ray source window 100 aligned with the gamma ray source 62, a detector window 102 aligned with the gamma ray detector 64, and the shield 70 disposed between the gamma ray source 62 and the gamma ray detector 64. It should be noted that, although only the detector window 102 is shown in the embodiment illustrated in FIG. 3, an individual detector window may be aligned with corresponding gamma ray detector (e.g., the gamma ray detector 64, the gamma ray detector 66). The shield 70 includes a chassis shielding block 104 coupled to (e.g., recessed into) the chassis 56 and a shielding assembly 106 coupled to (e.g., recessed into) the collar 58 in alignment with the chassis shielding block 104. The shielding assembly 106 may include shielding top plate 108 (e.g., shielding cover), a sealing part 110 (e.g., annular sealing cap) having an annular seal 114 disposed in an annular seal groove 112, a shielding insert 116 (e.g., annular shielding insert), and a shielding connection block 118 (e.g., curved shielding panel or semi-annular panel), which may be arranged one over another in a sequential arrangement and/or coaxial with one another in the radial direction 82. Various aspects of the gamma ray source window 100, the detector window 102, and shield 70 are discussed in further detail below.

In certain embodiments, the gamma ray source window 100 (e.g., structural window panel or plug) may be installed within a window recess or opening 120 on the outer side of the collar 58 at the location of the gamma ray source 62, so that gamma rays generated by the gamma ray source 62 may be output to the formation 12 through the gamma ray source window 100. The gamma ray source window 100 may be made of materials with low density and lower average atomic number (Z) (e.g., polyetheretherketone (PEEK), transparent or translucent materials) that allow transmitting of gamma rays in certain energy spectra range. The gamma ray source window 100 may be of any shapes suitable for covering the output gamma rays beam of the gamma ray source 62. For example, the gamma ray source window 100 may be a truncated cylindrical structure 122 having the same symmetrical axis as the collar 58. For example, the truncated cylindrical structure 122 may have a rectangular outer perimeter or border 124, a flat or planar inner surface 126, and a curved outer surface 128. In certain embodiments, the curved outer surface 128 may be matched or contoured to an outer surface 130 (e.g., outer annular surface) of the collar 58.

In addition, the detector window 102 (e.g., structural window panel or plug) may be installed within a window recess or opening 132 on the outer side of the collar 58 at the location of the gamma ray detector 64, so that the gamma ray detector 64 may receive gamma rays from the formation 12 through the detector window 102. The detector window 102 may be made of materials with low density and lower average atomic number (Z) (e.g., polyetheretherketone (PEEK), transparent or translucent materials) that allow transmitting of gamma rays in the certain energy spectra range. The detector window 102 may be of any shapes suitable for receiving input gamma ray beam from the formation 12. For example, in the illustrated embodiment, the detector window 102 may be a cylindrical structure 134 having a cylindrical sidewall 136, a flat or planar inner surface 138, and a curved outer surface 140. In certain embodiments, the curved outer surface 140 may be matched to the outer surface 130 (e.g., outer annular surface) of the collar 58.

The chassis shielding block 104 (e.g., curved shielding panel or semi-annular panel) may be disposed in a recess 142 formed in the chassis 56 between the gamma ray source 62 and the gamma ray detector 64. The chassis shielding block 104 may have a rectangular perimeter 144, an inner surface 146 (e.g., curved or flat inner surface), and an outer surface 148 (e.g., curved or flat outer surface). In certain embodiments, the chassis shielding block 104 may have a thickness 150 (e.g., a uniform thickness and/or a variable thickness) between the inner surface 146 and the outer surface 148. For example, the inner and outer surfaces 146 and 148 may be parallel to one another to define the uniform thickness 150. The chassis shielding block 104 may be made of dense shielding material (e.g., tungsten copper, HeavyMet made of tungsten nickel iron) and may be a relatively large block (e.g., comparing to the size of the gamma ray source 62) having a size that fits in the recess 142 between the gamma ray source 62 and the gamma ray detector 64 to reduce undesirable gamma rays traveling from the gamma ray source 62 directly to the gamma ray detector 64 in the chassis 56.

As further illustrated in FIG. 3, the shielding assembly 106 may be inserted into a shielding port 152 in the collar 58 and partially into a recess 154 in the chassis shielding block 104 between the gamma ray source 62 and the gamma ray detector 64, thereby further blocking or shielding the transmission of gamma rays from the gamma ray source 62 to the gamma ray detector 64 through the collar 58. The shielding assembly 106 may be disposed axially between the gamma ray source 62 and the gamma ray detector 64 in a straight line (e.g., axial line in the axial direction 80), wherein the shielding assembly 106 radially overlaps a radial length 156 of the gamma ray source 62 in the radial direction 82, and the shielding assembly 106 circumferentially overlaps the gamma ray source 62 and the gamma ray detector 64 in the circumferential direction 84. In some embodiments, a shielding width or diameter 158 of the shielding assembly 106 is greater than a source width or diameter 160 of the gamma ray source 62. As noted above, the shielding top plate 108, the sealing part 110, the shielding insert 116, and the shielding connection block 118 may be arranged one over another in a sequential arrangement and/or coaxial with one another in the radial direction 82. For example, the shielding top plate 108 may be disposed radially over and coupled to the sealing part 110 within the shielding port 152, the sealing part 110 may be disposed radially over and coupled to the shielding insert 116 in the shielding port 152, and the shielding insert 116 may be disposed radially over and coupled to the shielding connection block 118 disposed in the recess 154 in the chassis shielding block 104.

The components of the shielding assembly 106 may have a variety of shapes to facilitate insertion into and/or removal from the shielding port 152 and the recess 154 while the collar 58 is disposed about the chassis 56, the gamma ray source 62, and the gamma ray detector 64. The shielding top plate 108 may have a truncated cylindrical structure 162 having the same symmetrical axis as the collar 58. For example, the truncated cylindrical structure 162 may have a rectangular outer perimeter or border 164, a flat or planar inner surface 166, and a curved outer surface 168. In certain embodiments, the curved outer surface 168 may be matched or contoured to the outer surface 130 (e.g., annular outer surface) of the collar 58. However, in certain embodiments, the shielding top plate 108 may be an annular plug, a flat circular cover, or another suitable shape. In certain embodiment, the sealing part 110 and the shielding insert 116 may be annular components as shown in FIG. 3, rectangular components, oval components, or other shapes. In certain embodiment, the shielding connection block 118 (e.g., curved shielding panel or semi-annular panel) may have a rectangular perimeter 170, an inner surface 172 (e.g., curved or flat inner surface), and an outer surface 174 (e.g., curved or flat outer surface). In certain embodiments, the shielding connection block 118 may have a thickness 176 (e.g., a uniform thickness and/or a variable thickness) between the inner surface 172 and the outer surface 174. For example, the inner and outer surfaces 172 and 174 may be parallel to one another to define the uniform thickness 176. The inner surface 172 of the shielding connection block 118 also may be contoured to fit along the outer surface 148 (e.g., curved or flat outer surface) and/or within the recess 154 in the chassis shielding block 104. The shielding connection block 118 may be used to connect the shielding insert 116 to the chassis shielding block 104. The shielding top plate 108 may be used to retain the sealing part 110 and the shielding insert 116 to the shielding connection block 118. The shielding top plate 108, the shielding insert 116, and the shielding connection block 118 may be made of dense shielding material (e.g., tungsten copper, HeavyMet made of tungsten nickel iron). In some embodiments, the sealing part 110 may be made of metal (e.g., steel, stainless steel, Nickle based alloys, copper based alloys) for machining purpose, such as Monel, Inconel, MP35N, 17-4 PH, Beryllium copper. In some embodiments, the sealing part 110 may be made of dense shielding material.

Figure 4:
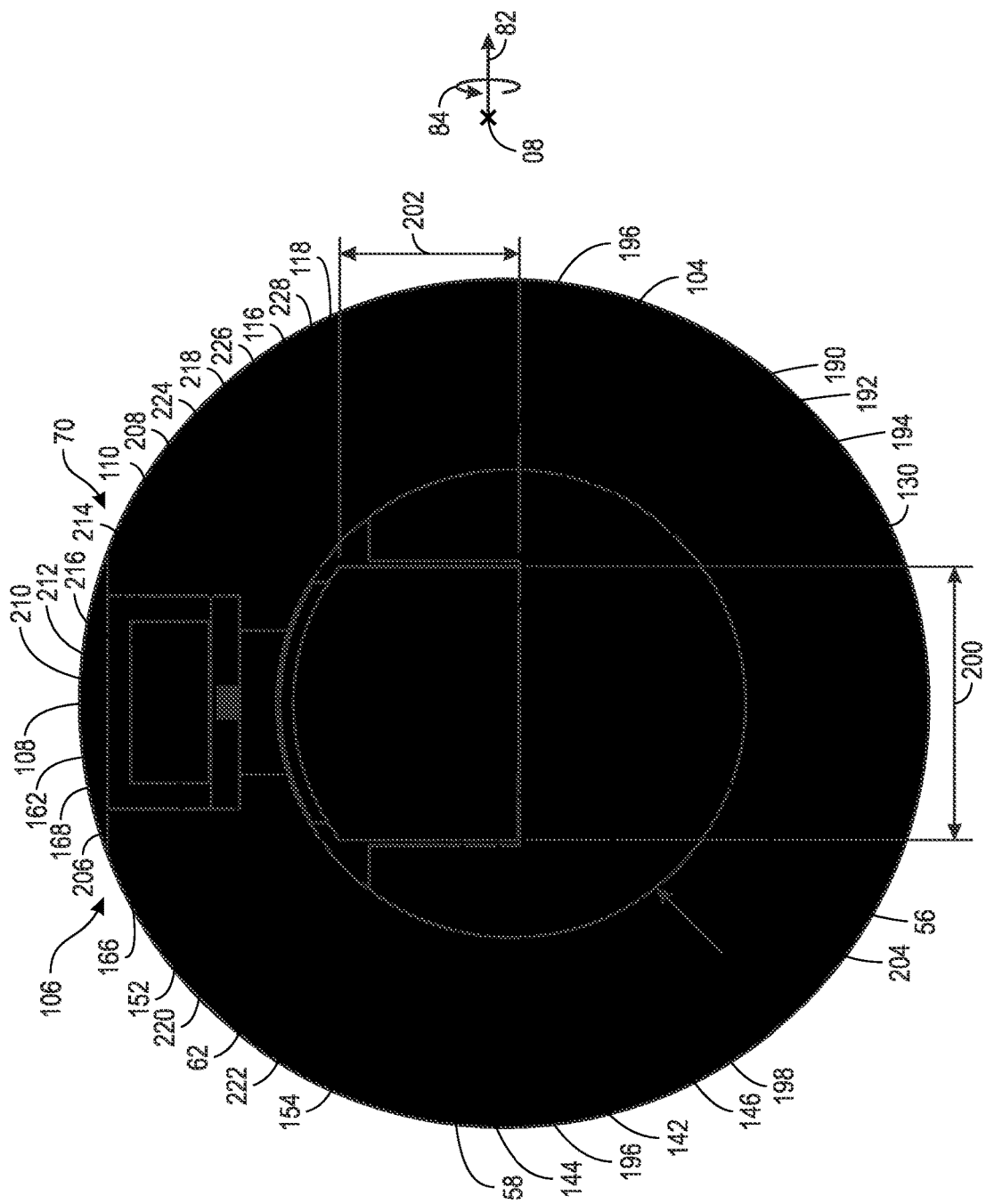
FIG. 4 is a partial cross-sectional end view of the nuclear logging tool used in the drilling system of FIG. 1, in accordance with an embodiment.
Figure 5:
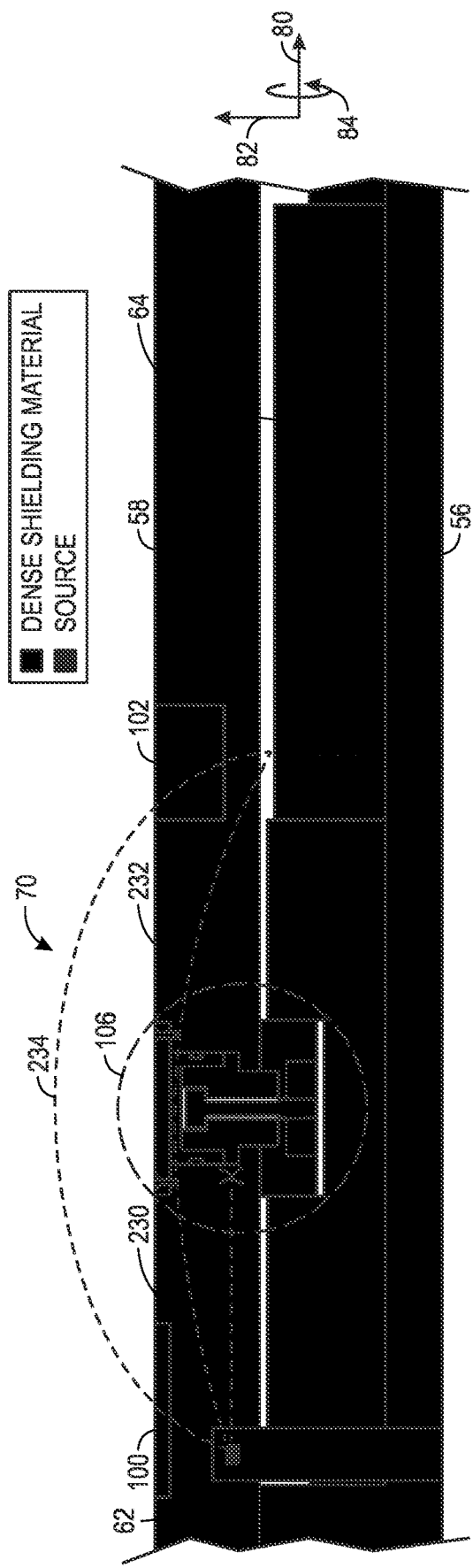
FIG. 5 is a partial cross-sectional side view of the nuclear logging tool used in the drilling system of FIG. 1, in accordance with an embodiment.

FIG. 4 is a partial cross-sectional end view of the nuclear logging tool 54 of FIGS. 1-3, further illustrating details of the shield 70 having the shielding assembly 106 inserted within the shielding port 152 in the collar 58 and partially into the recess 154 in the chassis shielding block 104. As illustrated in FIG. 4, the collar 58 (e.g., annular collar) is disposed about the chassis 56 (e.g., annular chassis) in a coaxial or concentric arrangement, such that an inner surface 190 (e.g., inner annular surface) of the collar 58 faces and/or contacts an outer surface 192 (e.g., outer annular surface) of the chassis 56. The chassis shielding block 104 is disposed in a recess 142 in the chassis 56, wherein the recess 142 extends radially inwardly from the outer surface 192 of the chassis 56 into an interior portion 194 of the chassis 56. In certain embodiments, the recess 142 in the chassis 56 is a rectangular slot having flat side surfaces 196 and a flat bottom surface 198 to fit with the rectangular perimeter 144 and the inner surface 146 of the chassis shielding block 104. The chassis shielding block 104 may be sized substantially larger than the gamma ray source 62 and/or the gamma ray detector 64. In the illustrated embodiment, a width 200 and a height 202 of the chassis shielding block 104 may be at least equal to or greater than 20, 30, 40, or 50 percent of a diameter 204 of the chassis 56. Additionally, the width 200 and the height 202 of the chassis shielding block 104 may be at least equal to or greater than 1.1, 1.2, 1.3, 1.4, 1.5, 2, 3, or 4 times the diameter 160 of the gamma ray source 62. Thus, the chassis shielding block 104 may be a relatively large block (e.g., comparing to the size of the gamma ray source 62) locating in the chassis 56. With reference to FIGS. 3, 4, and 5, the gamma ray source 62 may be located at a position along the radial direction 82, such that the gamma ray source 62 is radially separated or offset from the gamma ray detector 64.

As further illustrated in FIG. 4, the shielding top plate 108 (e.g., shielding cover), the sealing part 110 (e.g., annular sealing cap), the shielding connection block 118 (e.g., curved shielding panel or semi-annular panel), and chassis shielding block 104 are arranged one over another in the sequential arrangement and/or coaxial with one another in the radial direction 82. As discussed above, the shielding top plate 108 has the truncated cylindrical structure 162 with the flat or planar inner surface 166 disposed against the sealing part 110 and the curved outer surface 168 contoured along the outer surface 130 (e.g., annular outer surface) of the collar 58. The shielding top plate 108 may be disposed in a first open portion 206 of the shielding port 152, wherein the first open portion 206 may have a rectangular shape (e.g., rectangular recess) to receive and hold the shielding top plate 108.

The sealing part 110 may be disposed in a second open portion 208 of the shielding port 152, wherein the second open portion 208 may include a first annular bore sized to receive and hold the sealing part 110. For example, the annular seal 114 in the annular seal groove 112 of the sealing part 110 may be configured to seal along the second open portion 208 (e.g., first annular bore). The illustrated sealing part 110 (e.g., annular sealing cap) has a cup-shaped structure 210 with a circular top wall 212 coupled to an annular side wall 214, wherein the cup-shaped structure 210 defines an inner annular chamber 216.

The shielding insert 116 includes an annular flange 218 disposed axially between a first annular portion 220 (e.g., annular head) and a second annular portion 222 (e.g., annular body). The first annular portion 220 is disposed in the inner annular chamber 216 of the sealing part 110. The annular flange 218 abuts a bottom surface 224 of the annular side wall 214 of the sealing part 110 and a bottom annular ledge 226 of the second open portion 208 of the shielding port 152. The second annular portion 222 extends through a third open portion 228 (e.g., second annular bore) of the shielding port 152.

At least some components of the shielding assembly 106 (e.g., shielding top plate 108, sealing part 110, and shielding insert 116) are configured to be radially inserted into the shielding port 152 using progressively smaller cross-sectional areas of the components and the shielding port 152 in a radial inward direction. As illustrated, the annular flange 218 has a greater diameter than the first and second annular portions 220 and 222 of the shielding insert 116, and the first annular portion 220 has a greater diameter than the second annular portion 222 of the shield insert 116. Additionally, the first open portion 206 (e.g., rectangular recess) has a greater size than a first diameter of the second open portion 208 (e.g., first annular bore) of the shielding port 152, and the first diameter of the second open portion 208 (e.g., first annular bore) is greater than a second diameter of the third open portion 228 (e.g., second annular bore) of the shielding port 152, such that the shielding port 152 gradually decreases in size (e.g., width or diameter) in the radially inward direction and gradually increases in size in the radially outward direction. This gradually changing size of the shielding port 152 facilitates insertion and removal of at least part of the shielding assembly 106 (e.g., shielding top plate 108, sealing part 110, and shielding insert 116) from outside of the collar 58 of the nuclear logging tool 54, whereas the shielding connection block 118 and the chassis shielding block 104 may be installed on the chassis 56 before and/or during assembly of the collar 58 around the chassis 56. Additional details of the shielding assembly 106 are discussed in further detail below.

FIG. 5 is a partial cross-sectional side view of the nuclear logging tool 54 of FIGS. 1-4, further illustrating gamma ray paths outside of the nuclear logging tool 54 and partially inside of the nuclear logging tool 54 and blocked by the shield 70. As illustrated in FIG. 5, gamma rays may be generated by the gamma ray source 62 and transmit inside the collar 58. Some gamma rays may travel along a path 230 inside the collar 58 and be blocked by the shielding assembly 106 (e.g., blocked by the shielding top plate 108, or the shielding insert 116). These gamma rays may be blocked by the dense shielding material of the shielding assembly 106 and may not be received by the gamma ray detector 64. Some gamma rays may travel along a path 232 inside the collar 58 and be attenuated by the shielding assembly 106 (e.g., by the sealing part 110). These gamma rays may be attenuated by the metal material of the shielding assembly 106, and only a portion of these gamma rays may be received by the gamma ray detector 64. Some gamma rays may travel through the gamma ray window 100 and exit to the formation 12. These gamma rays may travel along a path 234, which may extend to the formation 12, and return to the detector window 102 and be received by the gamma ray detector 64. Those gamma rays travelling along the path 230 and 232 may not provide substantial information regarding the properties of the formation and may represent noise that needs to be subtracted from the overall signal received by the gamma ray detector 64. Those gamma rays travelling along the path 234 may provide information regarding the properties of the formation and may be included in the signal of the gamma ray detector 64. Accordingly, by using the shielding assembly 106, the gamma rays transmit from the gamma ray source 62 to the gamma ray detector 64 inside or through the nuclear logging tool (e.g., the chassis 56, the collar 58) may be sufficiently reduced.

Figure 6:
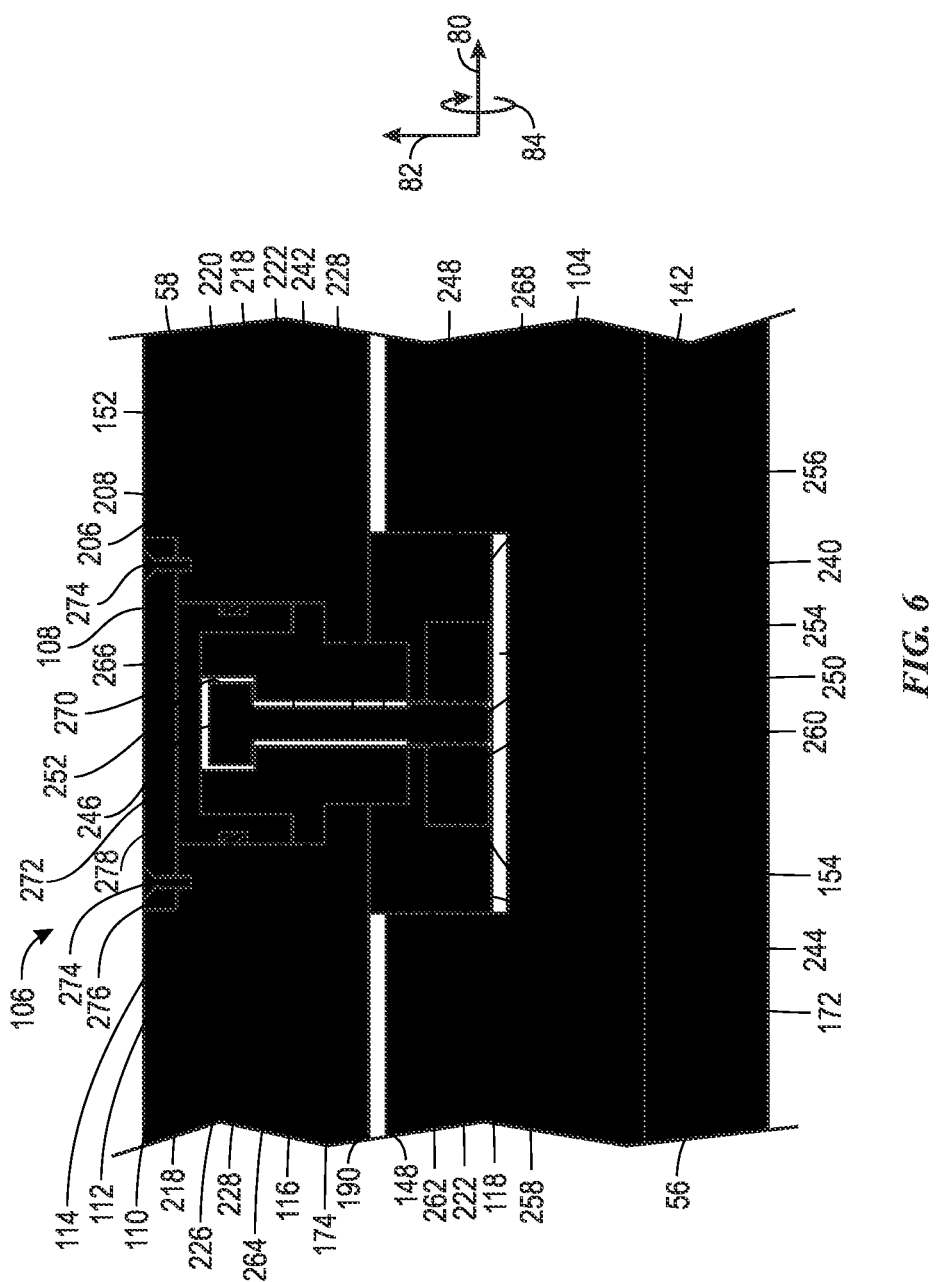
FIG. 6 is a partial cross-sectional side view of the nuclear logging tool used in the drilling system of FIG. 1 illustrating an embodiment of a shield of the nuclear logging tool, in accordance with an embodiment.

FIG. 6 is a partial cross-sectional side view of the nuclear logging tool 54 of FIGS. 1-5, further illustrating an embodiment of the shield 70 having a threaded fastener assembly 240 coupling together the shielding insert 116 and the shielding connection block 118. In the illustrated embodiment, the threaded fastener assembly 240 includes a male threaded fastener 242 (e.g., bolt) and a female threaded fastener 244 (e.g., nut). The male threaded fastener 242 includes a head 246, a shaft 248 coupled to and radially extending from the head 246, and a threaded portion 250 (e.g., male threads) along the shaft 248. The head 246 may be a tool-engageable head having a tool interface 252, such as a male or female tool interface having flats, slots, or other torque transfer features, configured to transfer torque from a tool to the male threaded fastener 242. The female threaded fastener 244 includes a threaded bore 254 (e.g., female threads) extending through a fastener body 256, such as a rectangular block or a hexagonal block. The fastener 256 may be made of a material different from the shielding connection block 118 (e.g., steel). The male threaded fastener 242 is configured to thread into the female threaded fastener 244 to radially pull together the shielding insert 116 and the shielding connection block 118, thereby securing the shielding insert 116 and the shielding connection block 118 within the nuclear logging tool 54.

In the illustrated embodiment, the shield 70 is assembled into the nuclear logging tool 54 partially before installation of the collar 58 around the chassis 56 and partially after installation of the collar 58 around the chassis 56. For example, before installing the collar 58 around the chassis 56, the chassis shielding block 104 may be installed into the recess 142 in the chassis 56, the female threaded fastener 244 may be installed into a recess 258 in the inner surface 172 of the shielding connection block 118, and the shielding connection block 118 (with the female threaded fastener 244) may be installed into the recess 154 in the chassis shielding block 104. The recess 258 and the female threaded fastener 244 may have complementary anti-rotation shapes that interface with one another (e.g., rectangular, hexagon, or other non-circular shapes), such that the female threaded fastener 244 does not rotate during rotation of the male threaded fastener 242 as discussed below. Initially, the shielding connection block 118 (with the female threaded fastener 244) may be inserted in the radial inward direction 82 into the recess 154, such that the inner surface 172 of the shielding connection block 118 contacts or abuts a bottom surface 260 of the recess 154 and the outer surface 174 of the shielding connection block 118 is flush with, recessed into, or slightly protruding from the outer surface 148 of the chassis shielding block 104. The collar 58 may then be installed around the chassis 56, the chassis shielding block 104, and the shielding connection block 118. The remaining components of the shield 70 (e.g., shielding assembly 106) may be installed externally through the shielding port 152 in the collar 58 after the collar 58 has been installed around the chassis 56.

As further illustrated in FIG. 6, the shielding insert 116 may be installed in the radial inward direction 82 into the shielding port 152 until the second annular portion 222 of the shielding insert 116 extends through the third open portion 228 (e.g., second annular bore) in the collar 58 and extends into a recess 262 in the top surface 174 of the shielding connection block 118. The recess 262 and the second annular portion 222 may be sized and shaped to mate with one another, such as an annular interface. Additionally, the shielding insert 116 may be installed in the radial inward direction 82 until the annular flange 218 abuts the bottom annular ledge 226 of the second open portion 208 (e.g., an annular portion 264) of the collar 58. Subsequently, the male threaded fastener 242 may be inserted through a fastener receptacle 266 in the shielding insert 116, through a fastener receptacle 268 in the shielding connection block 118, and into the threaded bore 254 in the female threaded fastener 244. A torque tool may then engage the head 246 (e.g., torque interface 252) to rotate the male threaded fastener 242, such that the threaded portion 250 of the shaft 248 threads into the threaded bore 254 in the female threaded fastener 244 and the head 246 recesses into a head recess 270 along an outer surface 272 (e.g., top surface) of the shielding insert 116. As the torque tool gradually tightens the male threaded fastener 242 with the female threaded fastener 244, the threaded fastener assembly 240 radially compresses the shielding insert 116 and the shielding connection block 118 radially about the annular portion 264 of the collar 58. Accordingly, the tightening of the threaded fastener assembly 240 causes a radial inward force of the annular flange 218 of the shielding insert 116 against the bottom annular ledge 226 at the annular portion 264, and a radial outward force of the outer surface 174 of the shielding connection block 118 against the inner surface 190 of the collar 58. Thus, the threaded fastener assembly 240 removably couples the shielding insert 116 to the shielding connection block 118 while the collar 58 is mounted around the chassis 56.

The shielding assembly 106 also includes the sealing part 110 and the shielding top plate 108. As illustrated in FIG. 6, after installation of the male threaded fastener 266, the sealing part 110 may be installed in the radial inward direction 82 into the second open portion 208 (e.g., first annular bore) of the shielding port 152 until the sealing part 110 substantially surrounds the first annular portion 220 of the shielding insert 116. The sealing part 110 has the cup-shaped structure 210 defining the inner annular chamber 216, which receives the first annular portion 220 of the shielding insert 116. The circular top wall 212 of the cup-shaped structure 210 extends over and covers the male threaded fastener 242 having the head 246 disposed in the head recess 270. The annular side wall 214 of the cup-shaped structure 210 also includes the annular seal 114 in the annular seal groove 112, wherein the annular seal 114 seals against the second open portion 208 (e.g., first annular bore) of the shielding port 152 to block fluid leakage into the nuclear logging tool 54. In some embodiments, the shielding assembly 106 may include one or more fasteners to couple the sealing part 110 to the collar 58.

In the illustrated embodiment, after installation of the sealing part 110, the shielding top plate 108 may be installed in the radial inward direction 82 into the first open portion 206 over the sealing part 110. The shielding top plate 108 may be removably coupled to the collar 58 via one or more fasteners 274, such as threaded fasteners. For example, the fasteners 274 may couple the shielding top plate 108 to the collar 58 in a border portion 276 of the shielding top plate 108 outside of the perimeter of the sealing part 110. However, any suitable arrangement of the fasteners 274 may be used to couple the shielding top plate 108 to the collar 58. The shield 70 may be removed in a removal process having a reverse order relative to the installation process described in detail above. Additionally, the shield 70 may have various modifications in the placement and/or geometry of the components while still enabling the installation and removal processes, which are at least partially performed while the collar 58 is mounted around the chassis 56.

In the embodiment illustrated in FIG. 6, a spring 278 may be inserted between the sealing part 110 and the shielding insert 116 (e.g., between the outer surface 272 and the sealing part 110) for support or for compensation of the thermal expansion caused by parts made of different materials. For example, the spring may include a helical spring, a spring washer, an elastomeric insert, or any combination thereof.

Figure 7:
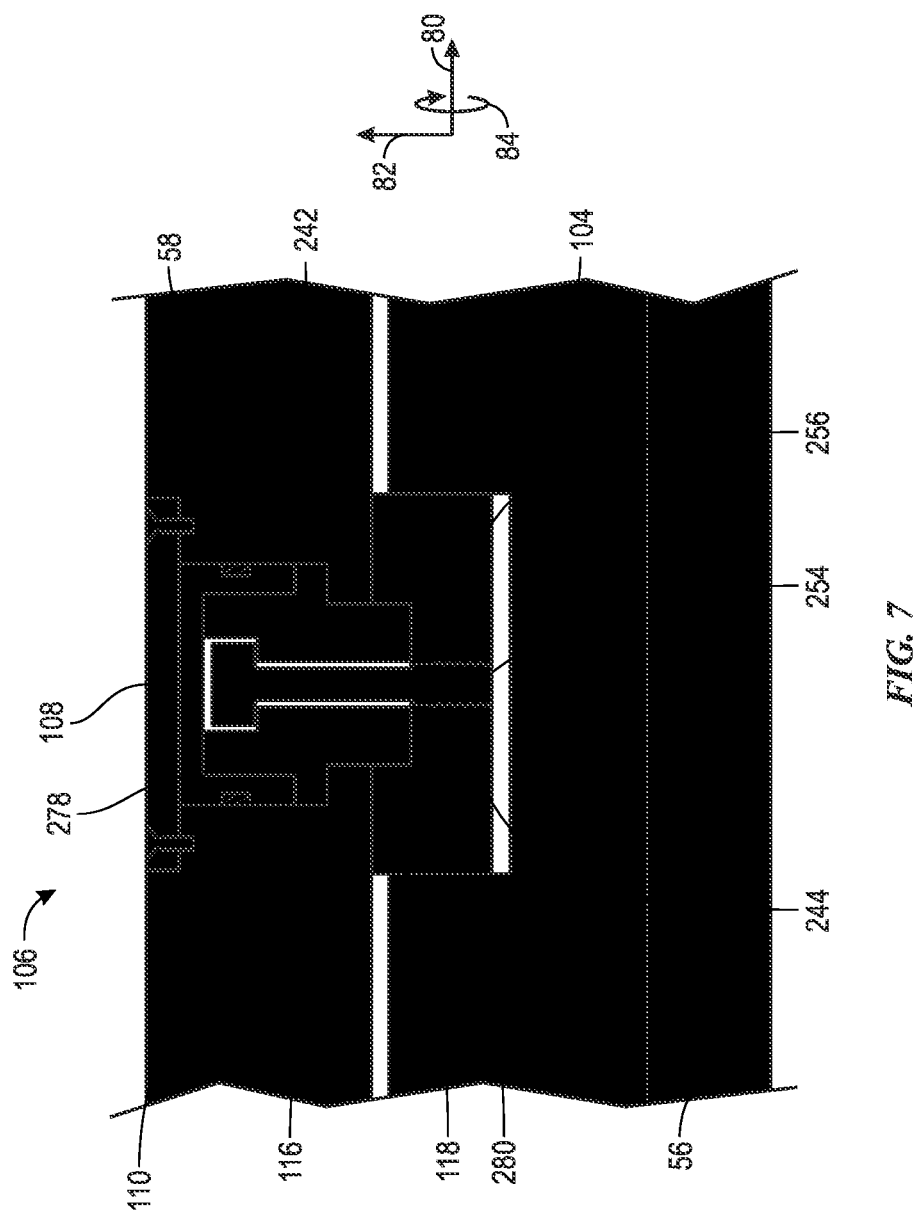
FIG. 7 is a partial cross-sectional side view of the nuclear logging tool used in the drilling system of FIG. 1 illustrating a second embodiment of the shield of the nuclear logging tool, in accordance with an embodiment.

FIG. 7 is a partial cross-sectional side view of the nuclear logging tool 54 of FIGS. 1-6, further illustrating a second embodiment of the shield 70 having the threaded fastener assembly 240 coupling together the shielding insert 116 and the shielding connection block 118. The embodiment of FIG. 7 is substantially the same as the embodiment of FIG. 6, except that the threaded fastener assembly 240 in the embodiment of FIG. 7 integrates the female threaded fastener 244 with shielding connection block 118 as a one-piece structure 280 (e.g., shielding connection block 118 with integrated female threaded fastener 244). In other words, the one-piece structure 280 includes both the shielding connection block 118 and the female threaded fastener 244 as a single continuous block of material, wherein the threaded bore 254 (e.g., female threads) extends through the one-piece structure 280 rather than a separate fastener body 256. In certain embodiments, the shielding connection block 118 in FIG. 7 may be made of metal (e.g., steel, stainless steel, Nickle based alloys, copper based alloys) while the shielding connection block 118 in the embodiment illustrated in FIG. 6 may be made of dense shielding material (e.g., tungsten copper, HeavyMet made of tungsten nickel iron). Thus, like elements are shown with like element numbers in FIGS. 6 and 7. Unless stated otherwise, the elements of FIG. 7 are substantially the same as described above with reference to FIG. 6.

Figure 8:
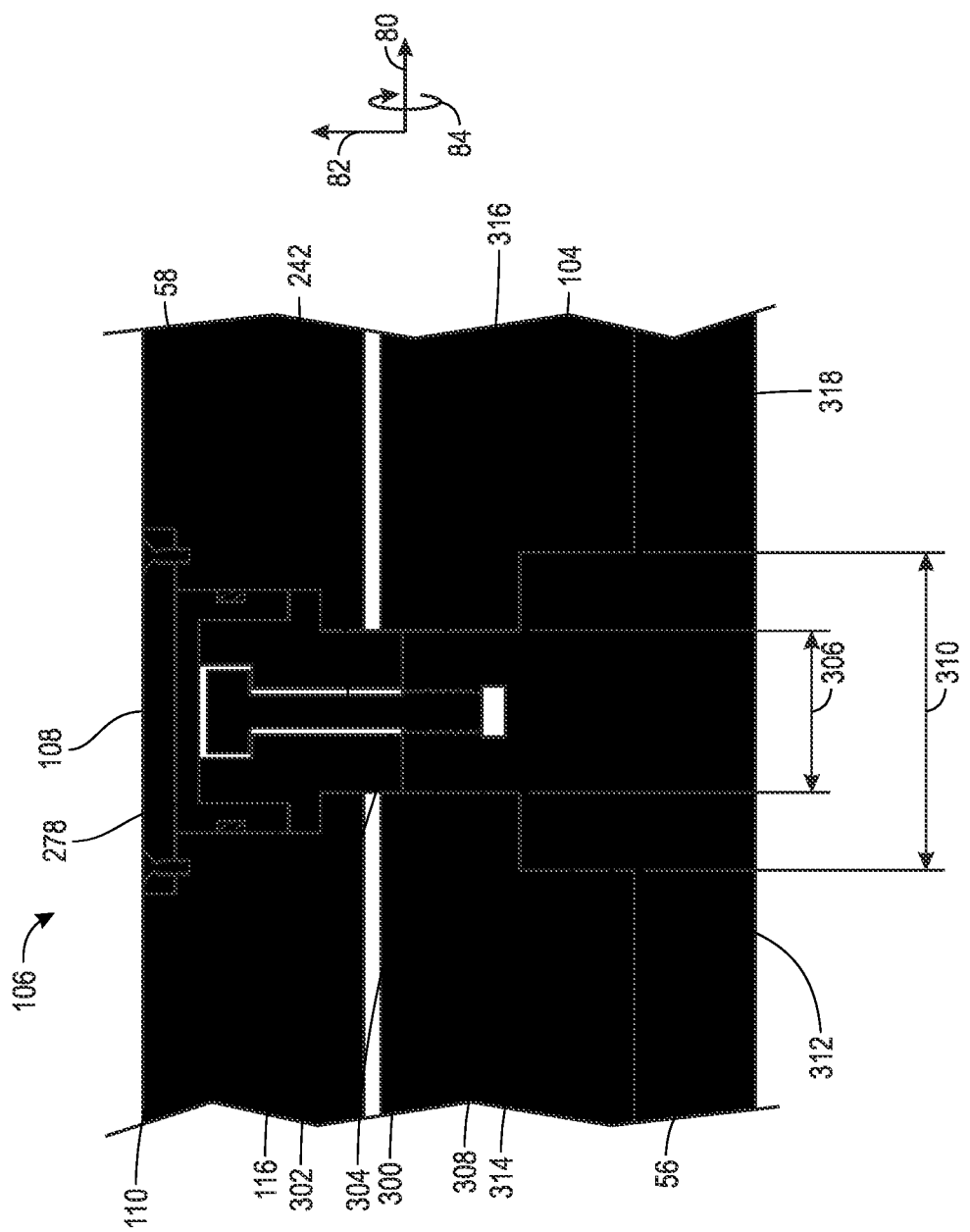
FIG. 8 is a partial cross-sectional side view of the nuclear logging tool used in the drilling system of FIG. 1 illustrating a third embodiment of the shield of the nuclear logging tool, in accordance with an embodiment.

FIG. 8 is a partial cross-sectional side view of the nuclear logging tool 54 of FIGS. 1-6, further illustrating a third embodiment of the shield 70 having the threaded fastener assembly 240 coupling together the shielding insert 116 and a first chassis portion 300 (e.g., a radially protruding annular portion) of the chassis 56 through an opening 302 (e.g., an annular opening) on the chassis shielding block 104. The embodiment of FIG. 8 is substantially the same as the embodiment of FIG. 7, except that the shielding insert 116 in the embodiment of FIG. 8 is coupled to the chassis 56 through the shielding block 104 without using the shielding connection block 118. Thus, like elements are shown with like element numbers in FIGS. 6 and 8. Unless stated otherwise, the elements are substantially the same as described above with reference to FIG. 6. In FIG. 8, the first chassis portion 300 may include a threaded bore 304 (e.g., female threads) extending through the first chassis portion 300. The male threaded fastener 242 is configured to thread into the threaded bore 304 of the first chassis portion 300 to radially pull together the shielding insert 116 and the chassis 56, thereby securing the shielding insert 116 within the nuclear logging tool 54. The first chassis portion 300 may have a width or diameter 306 and be supported by a second chassis portion 308 (e.g., a radially protruding annular portion) having a width or diameter 310. In some embodiments, the width or diameter 310 may be larger than the width or diameter 306.

As illustrated, the first and second chassis portions 300 and 308 collectively define a stepped annular protrusion 312 extending radially outward from the chassis 58 into a stepped annular receptacle 314 in the chassis shielding block 104. The stepped annular receptacle 314 includes a first receptacle 316 (e.g., annular receptacle) sized to receive the second annular portion 222 of the shielding insert 116 and the first chassis portion 300 of the stepped annular protrusion 312. The stepped annular receptacle 314 also includes a second receptacle 318 (e.g., annular receptacle) sized to receive the second chassis portion 308 of the stepped annular protrusion 312. In operation, as the male threaded fastener 242 engages the threaded bore 304 of the first chassis portion 300, the shielding insert 116 is forced radially inward into the first receptacle 316 against the first chassis portion 300, thereby removably securing the shielding insert 116 within the collar 58.

Figure 9:
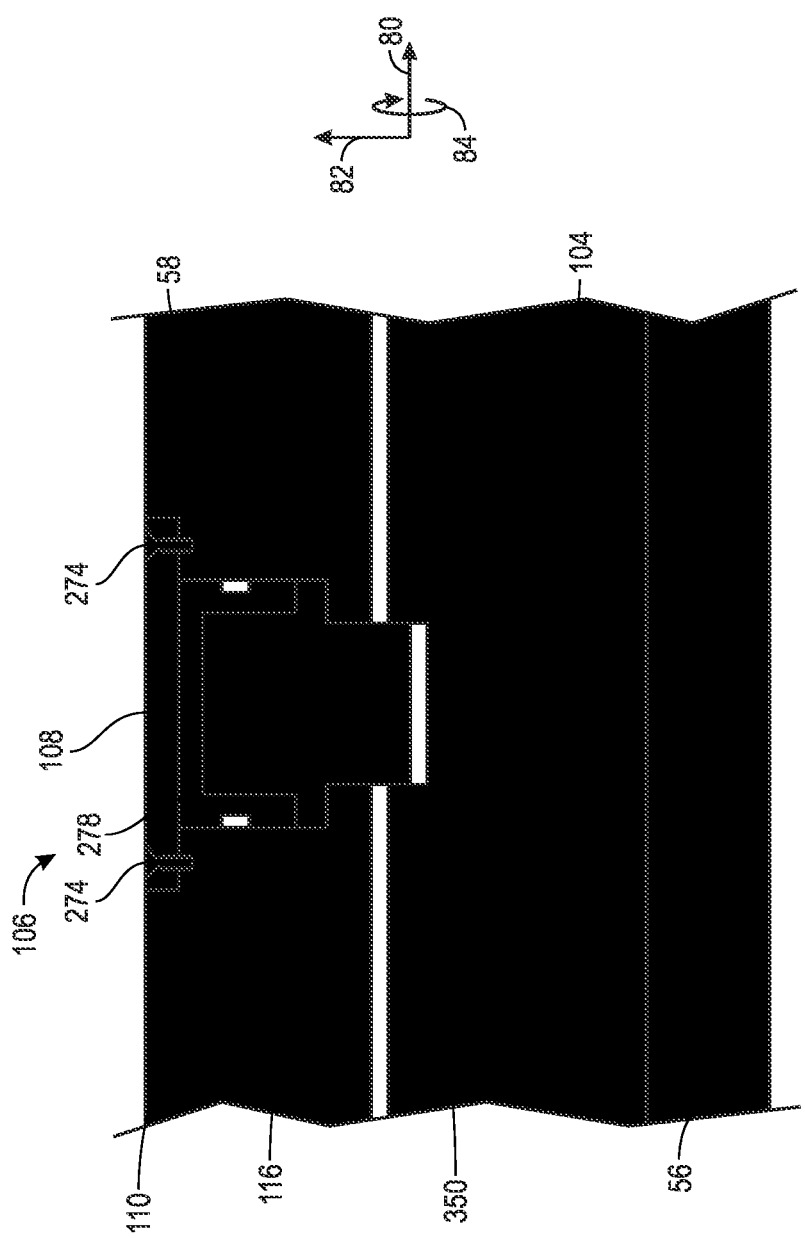
FIG. 9 is a partial cross-sectional side view of the nuclear logging tool used in the drilling system of FIG. 1 illustrating a fourth embodiment of the shield of the nuclear logging tool, in accordance with an embodiment.

FIG. 9 is a partial cross-sectional side view of the nuclear logging tool 54 of FIGS. 1-6, further illustrating a fourth embodiment of the shield 70 without the threaded fastener assembly 240 and the shielding connection block 118. The embodiment of FIG. 9 is substantially the same as the embodiment of FIG. 6, except that the shielding insert 116 in the embodiment of FIG. 9 is coupled to the shielding block 104 without using the threaded fastener assembly 240. Thus, like elements are shown with like element numbers in FIGS. 6 and 8. Unless stated otherwise, the elements are substantially the same as described above with reference to FIG. 6. In FIG. 9, the shielding insert 116 may extend radially into a recess 350 (e.g., annular recess) in the chassis shielding block 104, wherein the shielding insert 116 is held in place by the sealing part 110 and the shielding top plate 108. For example, the shielding top plate 108 may be secured to the collar 58 by the threaded fasteners 274, a brazed joint, a welded joint, an adhesive joint, or a combination thereof, between the shielding top plate 108 and the collar 58. In some embodiments, a brazed joint, a welded joint, and/or an adhesive joint may couple together the shielding insert 116 and the sealing part 110, the sealing part 110 and the shielding top plate 108, or a combination thereof. In some embodiments, a brazed joint, a welded joint, and/or an adhesive joint may couple together the collar 58 and one or more of the shielding insert 116, the sealing part 110, and the shielding top plate 108.

The technical effect of the disclosed embodiments is to provide shielding internally within the nuclear logging tool 54, such as within the collar 58, between the gamma ray source 62 and the gamma ray detector 64, thereby reducing the possibility of undesirable gamma ray transmission within the nuclear logging tool 54 without passing the gamma rays through a formation outside of the nuclear logging tool 54. The disclosed embodiments provide a shield 70 with a shielding assembly 106 coupled to (e.g., recessed into) the collar 58 in alignment with a chassis shielding block 104. The shielding assembly 106 is at least partially insertable and removable while the collar 58 is mounted around the chassis 56. For example, the shielding assembly 106 may include at least the shielding top plate 108, the sealing part 110, and the shielding insert 116, which can be radially inserted or removed while the collar 58 is mounted around the chassis 56. The shield 70 helps block the undesirable gamma ray transmissions to reduce noise, while allowing desirable gamma ray transmissions to pass through a formation outside of the nuclear logging tool 54 between the gamma ray source 62 and the gamma ray detector 64.

The subject matter described in detail above may be defined by one or more clauses, as set forth below.

A system includes a shield of a nuclear logging tool. The shield includes a shielding insert configured to mount at least partially inside the nuclear logging tool between a gamma ray source of the nuclear logging tool and a gamma ray detector of the nuclear logging tool. A first portion of the shielding insert is configured to mount in a collar of the nuclear logging tool and a second portion of the shielding insert is configured to mount in a chassis of the nuclear logging tool. The shield also includes a chassis shielding block configured to mount in the chassis between the gamma ray source and the gamma ray detector and a shielding top plate configured to couple to the collar and at least partially retain the shielding insert in the collar.

The system of any preceding clause, wherein the shielding insert is made of dense shielding material.

The system of any preceding clause, wherein the chassis shielding block is made of dense shielding material.

The system of any preceding clause, including a sealing part coupled to the shielding insert and configured to seal the shielding insert in the collar.

The system of any preceding clause, wherein the sealing part is brazed to the shielding insert.

The system of any preceding clause wherein the first calculated formation density is used to compensate the second calculated formation density to obtain a compensated formation density.

The system of any preceding clause, including a shielding connection block configured to couple the shielding insert to the chassis shielding block.

The system of any preceding clause, wherein the shielding connection block is made of dense shielding material.

The system of any preceding clause, including a threaded fastener configured to couple together the shielding insert and the shielding connection block.

The system of any preceding clause, including a threaded fastener configured to couple together the shielding insert and the chassis shielding block.

The system of any preceding clause, including the nuclear logging tool including the collar disposed about the chassis, wherein a shielding port extends radially through the collar toward the chassis, the shielding insert is disposed in the shielding port over the chassis shielding block, a sealing part is disposed in the shielding port over the shielding insert, and the shielding top plate is coupled to the collar over the sealing part.

The system of any preceding clause, wherein the shielding port includes an annular sealing port having a first annular bore, a second annular bore, and an annular ledge between the first and second annular bores, wherein the sealing part includes an annular sealing cap having a cup-shaped structure disposed in the first annular bore, wherein the first portion of the shielding insert includes a first annular portion disposed in the cup-shaped structure, the second portion of the shielding insert includes a second annular portion disposed in the second annular bore, and an annular flange of the shielding insert is disposed between the cup-shaped structure and the annular ledge.

The system of any preceding clause, wherein a first threaded fastener extends through the shielding insert and couples to a second threaded fastener in the shielding connection block, the chassis shielding block, or the chassis, wherein the first and second threaded fasteners are configured to thread together to hold the shielding insert in the shielding port.

The system of any preceding clause, wherein the shielding top plate is coupled to the collar via one or more fasteners, a brazed joint, a welded joint, or an adhesive joint.

A nuclear logging tool includes a chassis, a collar disposed about the chassis, a gamma ray source configured to emit gamma rays through a first window in the collar, and a gamma ray detector configured to receive gamma rays through a second window in the collar, and the gamma ray source and the gamma ray detector are offset from one another along an axis of the chassis. The nuclear logging tool also includes a shield. The shield includes a shielding insert mounted at least partially inside the nuclear logging tool between the gamma ray source and the gamma ray detector. A first portion of the shielding insert is mounted in the collar and a second portion of the shielding insert is mounted in the chassis. The shield also includes a chassis shielding block mounted in the chassis between the gamma ray source and the gamma ray detector. The shield also includes a shielding top plate coupled to the collar and at least partially retaining the shielding insert in the collar.

The nuclear logging tool of the preceding clause, wherein a shielding port extends radially through the collar toward the chassis, the shielding insert is disposed in the shielding port over the chassis shielding block, a sealing part is disposed in the shielding port over the shielding insert, and the shielding top plate is coupled to the collar over the sealing part.

The nuclear logging tool of the preceding clause, wherein the shielding port includes an annular sealing port having a first annular bore, a second annular bore, and an annular ledge between the first and second annular bores, wherein the sealing part includes an annular sealing cap having a cup-shaped structure disposed in the first annular bore, wherein the first portion of the shielding insert includes a first annular portion disposed in the cup-shaped structure, the second portion of the shielding insert includes a second annular portion disposed in the second annular bore, and an annular flange of the shielding insert is disposed between the cup-shaped structure and the annular ledge.

The nuclear logging tool of the preceding clause, including a shielding connection block configured to couple the shielding insert to the chassis shielding block, wherein a first threaded fastener extends through the shielding insert and couples to a second threaded fastener in the shielding connection block, the chassis shielding block, or the chassis, wherein the first and second threaded fasteners are configured to thread together to hold the shielding insert in the shielding port.

A method includes emitting gamma rays from a gamma ray source through a first window in a collar of a nuclear logging tool; receiving gamma rays at a gamma ray detector through a second window in the collar, and the gamma ray source and the gamma ray detector are offset from one another along an axis of a chassis of the nuclear logging tool; and shielding gamma rays directly between the gamma ray source and the gamma ray detector internally within the nuclear logging tool via a shield. The shield includes a shielding insert mounted at least partially inside the nuclear logging tool between the gamma ray source and the gamma ray detector. A first portion of the shielding insert is mounted in the collar and a second portion of the shielding insert is mounted in the chassis. The shield also includes a chassis shielding block mounted in the chassis between the gamma ray source and the gamma ray detector. The shield also includes a shielding top plate coupled to the collar and at least partially retaining the shielding insert in the collar.

The method of any preceding clause, wherein emitting the gamma rays includes directing the gamma rays through a geological formation, receiving the gamma rays includes receiving the gamma rays after passing through the geological formation, and shielding the gamma rays includes reducing noise associated with the gamma rays not passing through the geological formation.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

In the claims, means-plus-function clauses are intended to cover the structures described herein as performing the recited function and not only structural equivalents, but also equivalent structures. Thus, for example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A system, comprising:
   a shield of a nuclear logging tool, comprising:
   a shielding insert configured to mount at least partially inside the nuclear logging tool between a gamma ray source of the nuclear logging tool and a gamma ray detector of the nuclear logging tool, wherein a first portion of the shielding insert is configured to mount in a collar of the nuclear logging tool and a second portion of the shielding insert is configured to mount in a chassis of the nuclear logging tool;
   a chassis shielding block configured to mount in the chassis between the gamma ray source and the gamma ray detector; and
   a shielding top plate configured to couple to the collar and at least partially retain the shielding insert in the collar.

2. The system of claim 1, wherein the shielding insert is made of dense shielding material.

3. The system of claim 2, wherein the chassis shielding block is made of dense shielding material.

4. The system of claim 1, further comprising a sealing part coupled to the shielding insert and configured to seal the shielding insert in the collar.

5. The system of claim 4, wherein the sealing part is brazed to the shielding insert.

6. The system of claim 4, further comprising a spring disposed between the sealing part and the shielding insert.

7. The system of claim 1, further comprising a shielding connection block configured to couple the shielding insert to the chassis shielding block.

8. The system of claim 7, wherein the shielding connection block is made of dense shielding material.

9. The system of claim 7, further comprising a threaded fastener configured to couple together the shielding insert and the shielding connection block.

10. The system of claim 7, further comprising the nuclear logging tool comprising the collar disposed about the chassis, wherein a shielding port extends radially through the collar toward the chassis, the shielding insert is disposed in the shielding port over the chassis shielding block, a sealing part is disposed in the shielding port over the shielding insert, and the shielding top plate is coupled to the collar over the sealing part.

11. The system of claim 10, wherein the shielding port comprises an annular sealing port having a first annular bore, a second annular bore, and an annular ledge between the first and second annular bores, wherein the sealing part comprises an annular sealing cap having a cup-shaped structure disposed in the first annular bore, wherein the first portion of the shielding insert comprises a first annular portion disposed in the cup-shaped structure, the second portion of the shielding insert comprises a second annular portion disposed in the second annular bore, and an annular flange of the shielding insert is disposed between the cup-shaped structure and the annular ledge.

12. The system of claim 11, wherein a first threaded fastener extends through the shielding insert and couples to a second threaded fastener in the shielding connection block, the chassis shielding block, or the chassis, wherein the first and second threaded fasteners are configured to thread together to hold the shielding insert in the shielding port.

13. The system of claim 11, wherein the shielding top plate is coupled to the collar via one or more fasteners, a brazed joint, a welded joint, or an adhesive joint.

14. The system of claim 1, further comprising a threaded fastener configured to couple together the shielding insert and the chassis shielding block.

15. A nuclear logging tool, comprising:
a chassis;
a collar disposed about the chassis;
a gamma ray source configured to emit gamma rays through a first window in the collar;
a gamma ray detector configured to receive gamma rays through a second window in the collar, wherein the gamma ray source and the gamma ray detector are offset from one another along an axis of the chassis; and
a shield comprising:
a shielding insert mounted at least partially inside the nuclear logging tool between the gamma ray source and the gamma ray detector, wherein a first portion of the shielding insert is mounted in the collar and a second portion of the shielding insert is mounted in the chassis;
a chassis shielding block mounted in the chassis between the gamma ray source and the gamma ray detector; and
a shielding top plate coupled to the collar and at least partially retaining the shielding insert in the collar.

16. The nuclear logging tool of claim 15, wherein a shielding port extends radially through the collar toward the chassis, the shielding insert is disposed in the shielding port over the chassis shielding block, a sealing part is disposed in the shielding port over the shielding insert, and the shielding top plate is coupled to the collar over the sealing part.

17. The nuclear logging tool of claim 16, wherein the shielding port comprises an annular sealing port having a first annular bore, a second annular bore, and an annular ledge between the first and second annular bores, wherein the sealing part comprises an annular sealing cap having a cup-shaped structure disposed in the first annular bore, wherein the first portion of the shielding insert comprises a first annular portion disposed in the cup-shaped structure, the second portion of the shielding insert comprises a second annular portion disposed in the second annular bore, and an annular flange of the shielding insert is disposed between the cup-shaped structure and the annular ledge.

18. The nuclear logging tool of claim 17, further comprising a shielding connection block configured to couple the shielding insert to the chassis shielding block, wherein a first threaded fastener extends through the shielding insert and couples to a second threaded fastener in the shielding connection block, the chassis shielding block, or the chassis, wherein the first and second threaded fasteners are configured to thread together to hold the shielding insert in the shielding port.

19. A method, comprising:
emitting gamma rays from a gamma ray source through a first window in a collar of a nuclear logging tool;
receiving gamma rays at a gamma ray detector through a second window in the collar, wherein the gamma ray source and the gamma ray detector are offset from one another along an axis of a chassis of the nuclear logging tool; and
shielding gamma rays directly between the gamma ray source and the gamma ray detector internally within the nuclear logging tool via a shield, wherein the shield comprises:
a shielding insert mounted at least partially inside the nuclear logging tool between the gamma ray source and the gamma ray detector, wherein a first portion of the shielding insert is mounted in the collar and a second portion of the shielding insert is mounted in the chassis;
a chassis shielding block mounted in the chassis between the gamma ray source and the gamma ray detector; and
a shielding top plate coupled to the collar and at least partially retaining the shielding insert in the collar.

20. The method of claim 19, wherein emitting the gamma rays comprises directing the gamma rays through a geological formation, receiving the gamma rays comprises receiving the gamma rays after passing through the geological formation, and shielding the gamma rays comprises reducing noise associated with the gamma rays not passing through the geological formation.

* * * * *